(12) United States Patent
Wachter et al.

(10) Patent No.: US 9,151,421 B2
(45) Date of Patent: Oct. 6, 2015

(54) PROFILED CLAMP

(71) Applicant: NORMA GERMANY GMBH, Maintal (DE)

(72) Inventors: Gerhard Wachter, Buedingen (DE); Achim Kamp, Langenselbold (DE)

(73) Assignee: NORMA GERMANY GmbH, Maintal (DE)

( * ) Notice: Subject to any disclaimer, the term of this patent is extended or adjusted under 35 U.S.C. 154(b) by 379 days.

(21) Appl. No.: 13/660,290

(22) Filed: Oct. 25, 2012

(65) Prior Publication Data

US 2013/0111708 A1    May 9, 2013

(30) Foreign Application Priority Data

Nov. 5, 2011 (DE) .......................... 10 2011 117 753

(51) Int. Cl.
*F16L 33/04* (2006.01)
*F16L 23/08* (2006.01)

(52) U.S. Cl.
CPC .............. *F16L 23/08* (2013.01); *Y10T 24/1412* (2015.01); *Y10T 24/1451* (2015.01)

(58) Field of Classification Search
CPC ........... F16L 33/08; F16L 33/04; F16L 33/12; F16L 23/08; F16L 21/065; Y10T 24/1412; Y10T 24/14; Y10T 24/1457; Y10T 24/1441; Y10T 24/1451
USPC ......... 24/519, 19, 279, 280, 284, 285, 24, 21, 24/282; 285/367, 408, 409, 410, 411, 420
See application file for complete search history.

(56) References Cited

U.S. PATENT DOCUMENTS

| 1,362,784 | A | * | 12/1920 | Cooper | 24/282 |
| 1,467,708 | A | * | 9/1923 | Cooper | 24/282 |
| 1,568,043 | A | * | 1/1926 | Anderson | 188/249 |
| 1,910,116 | A | * | 5/1933 | Malleville | 24/19 |
| 2,150,986 | A | * | 3/1939 | Rauch et al. | 24/282 |
| 2,313,772 | A | * | 3/1943 | Russell | 239/504 |
| 2,318,946 | A | * | 5/1943 | Kass | 24/282 |
| 3,038,230 | A | * | 6/1962 | Henning | 24/282 |
| 3,106,757 | A | * | 10/1963 | Smith et al. | 24/20 R |
| RE25,769 | E | * | 4/1965 | Thurston et al. | 24/20 R |

(Continued)

FOREIGN PATENT DOCUMENTS

| CN | 101994885 | 3/2011 |
| DE | 3520925 | 10/1986 |

(Continued)

OTHER PUBLICATIONS

China Office action conducted in counterpart China Appln. No. 201210432118.2 (Jun. 16, 2014) along with an english translation thereof.

(Continued)

*Primary Examiner* — Robert J Sandy
*Assistant Examiner* — Caroline L Natirboff
(74) *Attorney, Agent, or Firm* — Greenblum & Bernstein, P.L.C.

(57) ABSTRACT

Profiled clamp that includes two half shells, each having a clamping head on a respective first end and a connection geometry on a respective second end. The profiled clamp also includes a clamping element to which the clamping heads are connected and a spring element preloaded to bear against an inside of the half shells. At least one of the two half shells is tiltable with respect to the clamping element.

16 Claims, 2 Drawing Sheets

(56) References Cited

U.S. PATENT DOCUMENTS

| | | | | |
|---|---|---|---|---|
| 4,109,350 A | * | 8/1978 | Acre | 24/20 EE |
| 5,570,499 A | * | 11/1996 | Katayama et al. | 24/285 |
| 5,815,892 A | | 10/1998 | Geppert | |
| 6,056,332 A | | 5/2000 | Foster | |
| 6,464,268 B1 | * | 10/2002 | Hough et al. | 285/367 |
| 6,672,631 B1 | | 1/2004 | Weinhold | |
| 7,055,223 B2 | * | 6/2006 | Cassel et al. | 24/20 R |
| 2012/0200083 A1 | * | 8/2012 | Krueger | 285/420 |
| 2013/0212842 A1 | * | 8/2013 | Rigollet et al. | 24/461 |

FOREIGN PATENT DOCUMENTS

| | | |
|---|---|---|
| DE | 19927281 | 1/2000 |
| DE | 198 82 234 | 3/2000 |
| DE | 19950619 | 11/2000 |
| DE | 10 2008 017 874 | 10/2009 |
| DE | 10 2008 047 787 | 5/2010 |
| DE | 20 2009 015 554 | 5/2010 |
| DE | 102008047787 | 5/2010 |
| EP | 2166265 | 3/2010 |
| GB | 2 446 813 | 8/2008 |
| JP | 63-18605 | 2/1988 |
| JP | 2000-27430 | 1/2000 |
| JP | 2002-257106 | 9/2002 |
| JP | 2006-226345 | 8/2006 |
| KR | 100393087 | 7/2003 |

OTHER PUBLICATIONS

Korean Office Action conducted in counterpart Korea Appln. No. 10-2012-0120652 (Jul. 31, 2014) (w/ English language translation).

German Office Action conducted in counterpart German Appln. No. 10 2011 117 753.5 (Sep. 27, 2012) (with partial English language translation).

Japanese Office Office Action conducted in counterpart Japanese Appln. No. 2012-232647 (Oct. 15, 2013).

European Office Office Action conducted in counterpart European Appln. No. 12006115.5 (Nov. 25, 2013).

China Office Action conducted in counterpart China Appln. No. 201210432118.2 (Feb. 4, 2015) (w/ English language translation).

* cited by examiner

PROFILED CLAMP

CROSS-REFERENCE TO RELATED APPLICATIONS

The present application claims priority under 35 U.S.C. §119 of German Patent Application No. 10 2011 117 753.5 dated Nov. 5, 2011, the disclosure of which is expressly incorporated by reference herein in its entirety.

BACKGROUND OF THE INVENTION

1. Field of the Invention

The invention relates to a profiled clamp having two half shells, which have respectively on a first end a clamping head and respectively on a second end a connection geometry for connecting the second ends. The clamping heads are connected to a clamping element, and at least one half shell can be tilted with respect to the clamping element.

2. Discussion of Background Information

A profiled clamp of the above-noted type is known, for example from DE 198 82 234 T1. The clamping element is embodied or formed as a tightening screw, which is guided with play through openings in the clamping heads so that both half shells can be tilted with respect to the tightening screw. In this way, it is possible to attach the profiled clamp preassembled to connecting flanges, that is, with an already preassembled tightening screw. After placement of the profiled clamp on the flanges of the lines to be connected, the half shells are connected to one another via their connecting geometry and subsequently the clamping element is tightened so that the diameter of the profiled clamp is reduced and thereby clamped. The disclosure of DE 198 82 234 T1 is expressly incorporated by reference herein in its entirety.

Profiled clamps are as a rule used to connect two lines that have connecting flanges at their ends, which are surrounded by the profiled clamp. For this purpose, the profiled clamp generally has a V-shaped profile. During the clamping of the profiled clamp, not only a radial force is exerted on the flanges, but also an axially directed force that presses together the flanges of the lines.

However, the placement of the known profiled clamps having two half shells is relatively difficult. The position of the half shells to one another and to the clamping element is not defined, when the half shells are not connected to one another. For precise alignment, in order to be able to connect the half shells to one another, it is then necessary to position both half shells. Under cramped spatial conditions, the placement of these profiled clamps is therefore difficult.

SUMMARY OF THE INVENTION

Embodiments of the invention are directed to a profiled clamp, which can be placed easily, and in particular, with one hand.

Accordingly, embodiments are directed to a profiled clamp of the type mentioned at the outset with a spring element under preloading that bears against an inside of the half shells.

This spring element now ensures that the half shells are pressed apart from one another at their second end. The two half shells are then tilted at the largest possible opening angle to one another. The opening angle is predetermined by the bearing of the clamping element in the clamping heads. The spring element thereby stabilizes not only the opening angle, but also the position of the half shells in an axial direction. The connection geometries of the second ends are held at the same axial position so that by simply pressing together the two half shells, the connection geometries of the second ends can be brought together. At the same time the spring element provides sufficient elasticity so that that not only a tilting, but also a rotation of the half shells to one another is possible so that a relatively easy placement of the profiled clamp can take place. The spring element thus ensures a defined position of the half shells in the opened state of the profiled clamp and thus renders possible a single-handed operation.

Preferably, the spring element is held on the clamping element. This prevents the spring element from slipping in the circumferential direction. At the same time the bearing of the spring element on insides of the half shells can be relatively easily ensured.

Preferably, the spring element has at least one shaping directed radially outwards with at least two openings, through which the clamping element extends. The shaping is V-shaped or M-shaped, for example. However, other embodiments are also conceivable, as long as a secure hold on the clamping element is ensured. The spring element is attached to the clamping element positively. The shaping is thereby placed between the clamping heads. The openings can thereby be so large that a relative movement between the clamping element and the shaping is possible. Since during the clamping of the clamping element the clamping heads are moved towards one another, a deformation of the shaping also occurs, which then is easily possible due to the play between the openings and the clamping element. In the opened state, one side of the shaping can also bear against one of the clamping heads from the start.

Preferably, the shaping is embodied or formed centrally between two legs of the spring band. The spring element then extends equally far into both half shells, so that a uniform force distribution takes place. The initial assembly is also simplified, since the alignment in which the spring element is assembled is then irrelevant.

Preferably, the spring element is longer than the clamping element. As soon as the clamping element is assembled, that is, the two clamping heads are connected to one another, the spring element then also bears against insides of the half shells. Since the spring element is longer than the clamping element, it is not possible for one end of the spring element to slip into the gap between the clamping heads bridged by the clamping element. The operational safety is therefore high.

Preferably, the clamping element is embodied or formed as a tightening screw. This represents a relatively frequently used embodiment of the clamping element, which can be operated with conventional tools. Relatively large clamping forces can be generated thereby.

It is particularly advantageous that a thread is embodied or formed or that a threaded nut is held in one of the clamping heads. If a threaded nut is used, the embodiment of a thread in the clamping head is naturally not necessary. The threaded nut is held in the clamping head in particular in a positive manner. The tightening screw can then be screwed in with a tool and thus a clamping of the profiled clamp can be caused, without an additional tool being necessary to hold a mating thread or a threaded nut. A single-handed operation is thus possible.

Preferably, a slot is embodied or formed in one of the clamping heads. A relatively large tilting of the half shells with respect to one another is thereby possible so that a large opening angle can be realized even when the clamping element is held in the clamping head of the other half shell relatively firmly, that is, only a tilting of a single half shell takes place. The production of the slot is thereby associated with little expenditure.

Preferably, the connection geometry in one of the half shells is embodied or formed as a hook and in the other half shell as a recess. An embodiment of this type is relatively easily possible. In this manner, the hook can be inserted into the recess relatively easily so that a hooking and thus a secure connection of the half shells take place. Relatively large forces can be transferred via a hook. Hooking-in can thereby take place by simple pressing together radially, especially as an axial alignment of the hook to the recess is predetermined by the spring element.

It is particularly advantageous that the hook is formed by a tab in particular curved radially outwards, which tab is embodied or formed in particular in a one-piece manner with the half shell. The hook therefore does not represent an additional element, but is embodied or formed in one piece with one of the half shells. The production of the hook is thereby very cost-effective. At the same time, due to the one-piece embodiment a relatively high transfer of force is ensured.

Embodiments of the invention are directed to a profiled clamp that includes two half shells, each having a clamping head on a respective first end and a connection geometry on a respective second end. The profiled clamp also includes a clamping element to which the clamping heads are connected and a spring element preloaded to bear against an inside of the half shells. At least one of the two half shells is tiltable with respect to the clamping element.

According to embodiments of the invention, the spring element may be held on the clamping element.

In embodiments, the spring element may have at least one shaping that is directed radially outwards with at least two openings, through which the clamping element extends. The shaping can be formed centrally between two legs of the spring element.

In accordance with embodiments of the invention, the spring element may be longer than the clamping element.

According to embodiments, the clamping element can include a tightening screw. One of the clamping heads may include one of a formed thread or a threaded nut.

In accordance with other embodiments, a slot is formed in one of the clamping heads.

Further, the connection geometry can include a hook formed in one of the two half shells and a recess formed in the other of the two half shells. The hook may be formed by a tab curved radially outwards. The tab may be formed in one piece with the one half shell.

According to further embodiments, cut-outs may be formed in the two half shells.

Embodiments of the invention are directed to a profiled clamp that includes a first clamping half shell, a second clamping half shell, and a clamping element structured and arranged to connect to respective first ends of the first and second clamping half shells. A shell connector is arranged on ends of the first and second clamping half shells opposite the clamping element, and a spring element is arranged on ends of the first and second clamping half shells with the clamping element. At least one of the first and second clamping half shells are pivotable about the clamping element.

According to embodiments, the spring element can include at least one radially outwardly directed shaping.

Further, the spring element may include a plurality of radially outwardly directed shapings.

In accordance with still yet other embodiments of the present invention, the spring element may be preloaded to bear against an interior of the first and second clamping half shells.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied or formed in practice.

Figure 1:
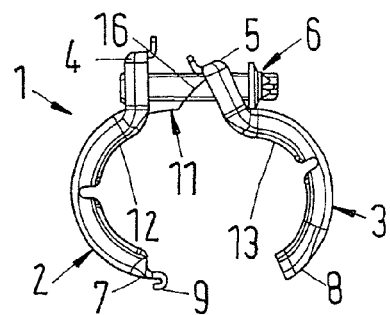
FIG. 1 illustrates a profiled clamp in the opened state in diagrammatic view.

FIG. 1 shows a profiled clamp 1, which has two half shells 2, 3. The profiled clamp 1 is thus embodied or formed in a two-part manner. The half shells 2, 3 have on a first end a clamping head 4, 5, respectively, in which a clamping element 6 is held. On a second end 7, 8, the half shells 2, 3 have a connection geometry 9, 10, respectively.

A spring element 11 is attached to the clamping element 6 such that it bears against insides 12, 13 of the half shells 2, 3 of the profiled clamp 1. The spring element 11 is thereby preloaded such that the half shell 3 is tilted with respect to the half shell 2. In this manner, the second ends 7, 8 are pushed away from one another. The profiled clamp 1 is thus held in an opened position by the spring element 11, wherein the position of the individual elements, that is the half shells 2, 3 and the clamping element 6 to one another are clearly defined.

Figure 2:
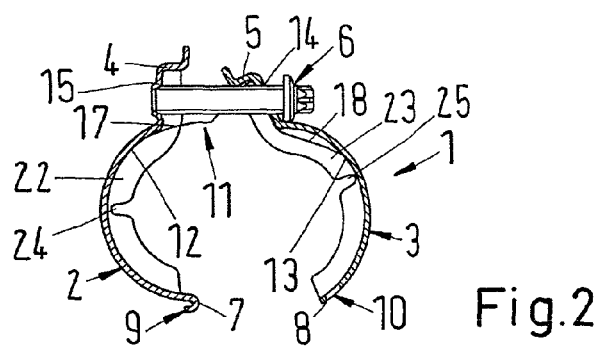
FIG. 2 illustrates a sectional view of the profiled clamp according to FIG. 1.

The spring element 11 is embodied or formed in the form of a leaf spring. A tightening screw is used as a clamping element 6. The clamping element 6 is thereby penetrated by a slot 14, which is embodied or formed in the clamping head 5 and screwed into a thread 15, which is embodied or formed in the clamping head 4 (FIG. 2). When screwing in the tightening screw or clamping the clamping element 6 therefore the clamping heads 4, 5 are moved towards one another so that after prior closing of the profiled clamp 1, that is, after the connection of the second ends 7, 8, a clamping of the profiled clamp 1 takes place.

The spring element 11 in this example has a V-shaped shaping 16, which is arranged centrally between two legs 17, 18 of the spring element 11. On both sides of the V or of the shaping, an opening is embodied or formed, through which the clamping element 6 is guided. The spring element 11 is therefore securely attached to the clamping element 6. The shaping 16 is thereby arranged between the clamping heads 4, 5.

Figure 3:
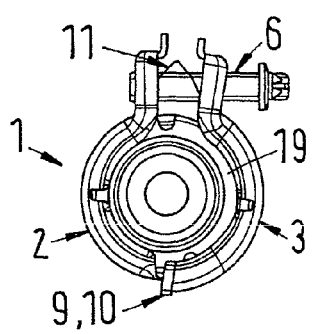
FIG. 3 illustrates the profiled clamp in the closed, unclamped state.

FIG. 3 shows the profiled clamp 1 in the closed state. The profiled clamp 1 is placed around a flange 19 such that the flange 19 extends into the profile of the profiled clamp 1. By simply pressing together the half shells 2, 3, the connection geometries 9, 10 can be brought into engagement with one another, e.g., the connection geometry 9 embodied or formed as a hook is inserted into the connection geometry 10 embodied or formed as a shaping or recess. In this way, the half shells 2, 3 are hooked to one another. Further, the spring element 11 was elastically deformed. Since the spring element 11 is located on the insides 12, 13 of the half shells 2, 3, the spring element 11 is virtually invisible. The spring element 11 is visible only in the region of the clamping element 6 between the clamping heads 4, 5. The V-shaped shaping 16, which is located between the clamping heads 4, 5, in particular can be seen in the exemplary embodiment.

Figure 4:
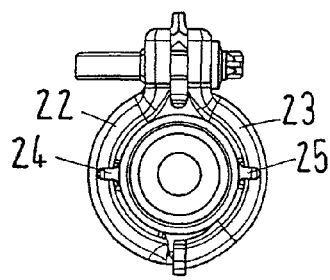
FIG. 4 illustrates the profiled clamp in the closed and clamped state.

In this state it is no longer possible for the individual elements to fall apart, however, a correction of the fit of the profiled clamp 1 in the flange 19 is possible. The profiled clamp 1 is not clamped until the tightening of the clamping element 6 or screwing-in of the tightening screw, and then exerts corresponding retention forces. This is shown in FIG. 4.

Figure 5:
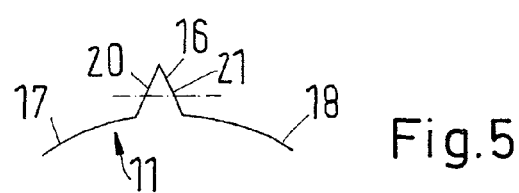
FIG. 5 illustrates a spring element of a first exemplary embodiment in side view.

FIG. 5 shows the spring element 11 diagrammatically in side view. The V-shaped shaping 16 is arranged centrally between the legs 17, 18. The spring element 11 is formed for example by a sheet metal strip and can have a pre-curvature, which is somewhat smaller than the curvature of the half shells 2, 3 so that a preloading is ensured. Openings 20, 21 are provided in the V-shaped shaping 16, through which openings the clamping element 6 can be guided. The size of the openings 20, 21 is thereby dimensioned such that the clamping element has some play. A relative movement between the clamping element 6 and the spring element 11 or the shaping 16 is therefore possible.

Figure 6:
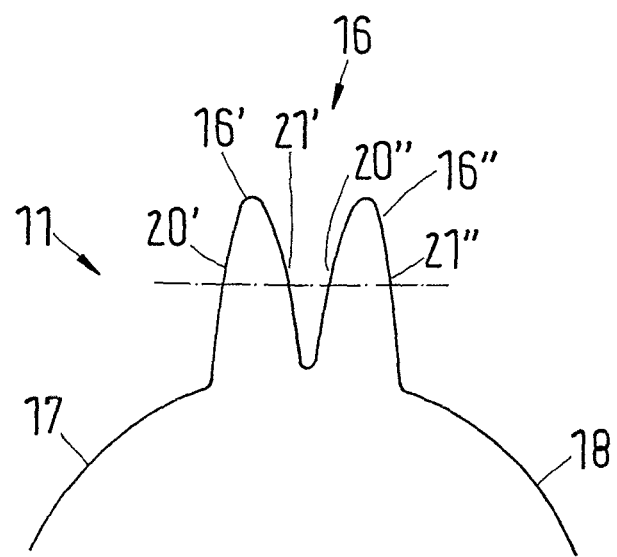
FIG. 6 illustrates a spring element of a second exemplary embodiment.

FIG. 6 shows a second exemplary embodiment of the spring element 11, in which the shaping 16 is embodied or formed in an M-shaped manner. The shaping 16 is thereby formed as it were by two elevations 16', 16". In order to be able to guide the clamping element 6 through the shaping 16, an opening is necessary in each leg of the M-shaped shaping 16, that is, a total of four openings. The elevation 16' accordingly has the openings 20' and 21' and the elevation 16" has the openings 20" and 21". With an embodiment of this type the outer flanks of the shaping 16 bear against insides of the clamping heads 4, 5. In the opened state of the clamp a more symmetrical alignment of the spring element 11 thus results.

Other embodiments of the shaping 16 are likewise possible. The only important factor thereby is that the shaping has openings through which the clamping element can be guided in order to hold the shaping 16 between the clamping heads 4, 5 and thus the spring element 11 inside the clamp.

In the case of the profiled clamp 1 shown, a cutout 24, 25 is respectively embodied or formed in profile walls 22, 23 of the half shells 2, 3. Due to this cutout 24, 25 the profiled clamp 1 has a somewhat higher elasticity, so that it can be used in a larger tolerance range.

The cutouts 24, 25 however can also be used to accommodate a corresponding projection of the flange 19 and thus to secure a defined angular position of the profiled clamp 1 with respect to the flange 19.

In delivery condition, that is, a preassembled condition, the profiled clamp 1 is held open by the spring element 11, which presses against insides of the half shells. Since the spring element lies inside the profiled clamp or in the profile of the profiled clamp, no additional space requirement is necessary. The clamping element is guided through openings in the spring element and thereby positions the spring element inside the profiled clamp. By a preloading of the spring element it is ensured thereby that the opened profiled clamp has the maximum opening angle. The profiled clamp can then be placed on a flange relatively easily.

Subsequently, the half shells are pressed together such that the second ends with their connection geometries lock or hook to one another. The profiled clamp is thus closed and already held on the flange in a manner secured against loss. The closing of the half shells against the force of the spring element thereby occurs, which is thereby elastically deformed. By subsequent clamping of the clamping element, the clamping of the profiled clamp finally takes place.

An attachment free from play of the clamping element inside the clamping heads of the profiled clamp is achieved by the spring element. A defined positioning of the half shells and of the clamping element with respect to one another is therefore also given in the opened state. A very simple final assembly is therefore possible, for example, single-handedly, wherein assembly forces smaller than 40 N can be realized.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A profiled clamp comprising:
   two half shells, each having a clamping head on a respective first end and a connection geometry on a respective second end;
   a clamping element to which the clamping heads are connected; and
   a spring element biased against a radial inner side of the half shells so that the second ends are pushed away from each other,
   wherein at least one of the two half shells is tiltable with respect to the clamping element.

2. The profiled clamp according to claim 1, wherein the spring element is held on the clamping element.

3. The profiled clamp according to claim 1, wherein the spring element has at least one shaping that is directed radially outwards with at least two openings, through which the clamping element extends.

4. The profiled clamp according to claim 3, wherein the at least one shaping is formed centrally between two legs of the spring element.

5. The profiled clamp according to claim 1, wherein the spring element is longer than the clamping element.

6. The profiled clamp according to claim 1, wherein the clamping element comprises a tightening screw.

7. The profiled clamp according to claim 6, wherein one of the clamping heads comprises one of a formed thread or a threaded nut.

8. The profiled clamp according to claim 1, wherein a slot is formed in one of the clamping heads.

9. The profiled clamp according to claim 1, wherein the connection geometry comprises a hook formed in one of the two half shells and a recess formed in the other of the two half shells.

10. The profiled clamp according to claim 9, wherein the hook is formed by a tab curved radially outwards.

11. The profiled clamp according to claim 10, wherein the tab is formed in one piece with the one half shell.

12. The profiled clamp according to claim 1, further comprising cut-outs formed in the two half shells.

13. A profiled clamp comprising:
a first clamping half shell;
a second clamping half shell;
a clamping element structured and arranged to connect to respective first ends of the first and second clamping half shells;
a shell connector arranged on second ends of the first and second clamping half shells opposite the clamping element;
a spring element arranged on the first ends of the first and second clamping half shells with the clamping element to bias the second ends away from each other; and
at least one of the first and second clamping half shells being pivotable about the clamping element.

14. The profiled clamp according to claim 13, wherein the spring element comprises at least one radially outwardly directed shaping.

15. The profiled clamp according to claim 13, wherein the spring element comprises a plurality of radially outwardly directed shapings.

16. The profiled clamp according to claim 13, wherein the spring element is preloaded to bear against an interior of the first and second clamping half shells.

* * * * *